US009031552B2

(12) United States Patent
Haberkorn et al.

(10) Patent No.: US 9,031,552 B2
(45) Date of Patent: May 12, 2015

(54) METHOD FOR TESTING AN INBOUND AND/OR AN OUTBOUND ROAMING FUNCTIONALITY OF A FIRST PUBLIC LAND MOBILE NETWORK (PLMN) AND A SECOND PUBLIC LAND MOBILE NETWORK (PLMN), AND SYSTEM FOR TESTING

(75) Inventors: Guenter Haberkorn, Birgland/Schwend (DE); Michael Stangl, Nuremberg (DE)

(73) Assignee: Telekom Deutschland GmbH, Bonn (DE)

( * ) Notice: Subject to any disclaimer, the term of this patent is extended or adjusted under 35 U.S.C. 154(b) by 80 days.

(21) Appl. No.: 13/702,591

(22) PCT Filed: Jun. 9, 2011

(86) PCT No.: PCT/EP2011/002826
§ 371 (c)(1),
(2), (4) Date: Feb. 15, 2013

(87) PCT Pub. No.: WO2011/154137
PCT Pub. Date: Dec. 15, 2011

(65) Prior Publication Data
US 2013/0231096 A1 Sep. 5, 2013

Related U.S. Application Data

(60) Provisional application No. 61/353,030, filed on Jun. 9, 2010.

(30) Foreign Application Priority Data

Jun. 9, 2010 (EP) .................................... 10005944

(51) Int. Cl.
*H04W 24/00* (2009.01)
*H04W 24/08* (2009.01)
*H04W 8/12* (2009.01)
*H04W 8/26* (2009.01)

(52) U.S. Cl.
CPC .............. *H04W 24/00* (2013.01); *H04W 24/08* (2013.01); *H04W 8/12* (2013.01); *H04W 8/26* (2013.01)

(58) Field of Classification Search
CPC ..... H04W 24/00; H04W 24/02; H04W 24/04; H04W 24/06; H04W 24/08; H04W 24/10
USPC ......... 455/41, 7, 423, 424, 425, 67.11, 67.12, 455/67.14, 115.1, 115.2, 115.3
See application file for complete search history.

(56) References Cited

U.S. PATENT DOCUMENTS

2009/0061860 A1  3/2009  Jiang

OTHER PUBLICATIONS

IR 24.6.0—End-to-End Functional Capability Specification for Inter-PLMN Roaming (Stage 4 Testing), GSM Association, Version 6, Nov. 30, 2009, p. 1-14.
European Patent Office, International Search Report in International Patent Application No. PCT/EP2011/002826 (Oct. 18, 2011).
European Patent Office, Extended European Search Report in European Patent Application No. 10005944 (Nov. 11, 2010).

*Primary Examiner* — Marcos Batista
(74) *Attorney, Agent, or Firm* — Leydig, Voit & Mayer, Ltd.

(57) ABSTRACT

A method for testing at least one of an inbound or an outbound roaming functionality of a first public land mobile network and a second public land mobile network includes: assigning a first Mobile Station International Subscriber Directory Number (MSISDN) as a testing number in the first public land mobile network; triggering a simulated initiation of the first MSISDN in the second public land mobile network; assigning a second MSISDN as a testing number in the first public land mobile network; activating Call Forwarding on Not Reachable (CFNRc) functionality on the first MSISDN with forwarding to the second MSISDN; forwarding a Provide Roaming Number (PRN) request for the first MSISDN to a Visitor Location Register (VLR) of the second public land mobile network; and receiving a Mobile Station Roaming Number (MSRN) from the VLR of the second public land mobile network.

14 Claims, 2 Drawing Sheets

METHOD FOR TESTING AN INBOUND AND/OR AN OUTBOUND ROAMING FUNCTIONALITY OF A FIRST PUBLIC LAND MOBILE NETWORK (PLMN) AND A SECOND PUBLIC LAND MOBILE NETWORK (PLMN), AND SYSTEM FOR TESTING

CROSS-REFERENCE TO RELATED APPLICATIONS

This patent application is a national stage entry under 35 U.S.C. §371 of International Application No. PCT/EP2011/002826, filed Jun. 9, 2011, and claims priority to European Patent Application No. EP 10005944.3, filed Jun. 9, 2010, and U.S. Provisional Patent Application No. 61/353,030, filed Jun. 9, 2010. The International Application was published in English on Dec. 15, 2011 as WO 2011/154137 A1.

FIELD

The present invention relates a method for testing an inbound and/or an outbound roaming functionality of a first public land mobile network (PLMN) and a second public land mobile network (PLMN). The present invention further relates to a system for testing such a roaming functionality.

BACKGROUND

Presently, performing tests regarding the roaming functionality between public land mobile networks (PLMN) is comparably costly and time consuming. This is due to the fact that testing, e.g. the outbound functionality of a public land mobile network (PLMN), requires equipment that is physically located in the remote (or foreign) public land mobile network (PLMN). Such a testing equipment simulates a mobile station located in the foreign network in the same way as if a client would be present in the foreign network trying to request network service.

Due to the comparably high costs of performing such testing, the density of performed tests is comparably low, both geographically and in time. This can lead potentially to undetected reduced Quality of Service for a comparably long time and therefore to financial losses and to discomfort of the users of the public land mobile networks (PLMN).

SUMMARY

In an embodiment, the present invention provides a method for testing at least one of an inbound or an outbound roaming functionality of a first public land mobile network and a second public land mobile network, wherein a test system is located in a third public land mobile network. The method includes: assigning a first Mobile Station International Subscriber Directory Number (MSISDN) as a testing number in the first public land mobile network; triggering a simulated initiation of the first MSISDN in the second public land mobile network; assigning a second MSISDN as a testing number in the first public land mobile network; activating Call Forwarding on Not Reachable (CFNRc) functionality on the first MSISDN with forwarding to the second MSISDN; forwarding a Provide Roaming Number (PRN) request for the first MSISDN to a Visitor Location Register (VLR) of the second public land mobile network; and receiving a Mobile Station Roaming Number (MSRN) from the VLR of the second public land mobile network.

DETAILED DESCRIPTION

In an embodiment, the present invention provides a cost effective testing method that preferably performs testing in an automated fashion, especially for testing of the outbound roaming functionality of the public land mobile network (PLMN).

In an embodiment, the present invention provides a method for testing an inbound and/or an outbound roaming functionality of a first public land mobile network (PLMN) and a second public land mobile network (PLMN), wherein a test system is located in a third public land mobile network, wherein the method comprises the following steps:

initializing a first Mobile Station International Subscriber Directory Number (MSISDN) as a testing number in the first public land mobile network (PLMN), initializing a second Mobile Station International Subscriber Directory Number (MSISDN) as a testing number in the first public land mobile network (PLMN), activating the functionality Call Forwarding on Not Reachable (CFNRc) on the first Mobile Station International Subscriber Directory Number (MSISDN) with forwarding to the second Mobile Station International Subscriber Directory Number (MSISDN), forwarding of a Provide Roaming Number (PRN) request for the first Mobile Station International Subscriber Directory Number (MSISDN) to a Visitor Location Register (VLR) of the second public land mobile network (PLMN), receiving a Mobile Station Roaming Number (MSRN) from the Visitor Location Register (VLR) of the second public land mobile network (PLMN).

According to the present invention, it is thereby advantageously possible that testing of the roaming functionality can be performed cost effectively and without requiring equipment that is physically located in the (remote or foreign) second public land mobile network (PLMN). Furthermore, it is advantageously possible according to the inventive method that reductions of the quality of service regarding outbound roaming can be detected in the same quality and reaction time as it is possible with regard to inbound roaming functionality. Furthermore, it is advantageous that it is possible to improve the comparability (in the testing pattern) between testing the inbound roaming functionality and the outbound roaming functionality. According to the present invention, it is easily possible to focus (both inbound roaming and outbound roaming) testing on a specific geographical zone (e.g. around place of high public interest such as, e.g. sports events or the like) (which would not be possible in case a physical equipment would be required for testing).

The method according to the present invention can be performed (and the system for testing according to the present invention can be hosted) in association with the first public land mobile network (PLMN), in the form of a hosted solution. The present invention provides the possibility that a comparably high density of test cases can be performed (both regarding the geographical scope and regarding time).

Preferably, the method and the system according to the present invention allows for an automated reporting and alarming functionality, especially an automated reporting of Key Performance Indicators (KPI) in the sense of Quality of Service reports and in the form of alarm notifications in case of a Quality of service level below a certain threshold. It is especially advantageous that no physical equipment is required specifically for performing the testing in the second public land mobile network (PLMN). Preferably, the method relies on the usage of messages generated by the respective public land mobile network (PLMN) entities that adhere to the standard specification.

According to the present invention, it is advantageous that a first Key Performance Indicator (KPI) is obtained after receiving the Mobile Station Roaming Number (MSRN) from the Visitor Location Register (VLR) of the second public land mobile network (PLMN), wherein the first Key Performance Indicator (KPI) is related to the location update outbound.

According to the present invention, it is thereby advantageously possible to obtain a valuable Key Performance Indicator (KPI) information in a simple and efficient manner.

According to a preferred embodiment of the present invention, the method comprises the following further steps:

initializing a third Mobile Station International Subscriber Directory Number (MSISDN) as a testing number in the first public land mobile network (PLMN), triggering an outgoing test call to the Mobile Station Roaming Number (MSRN) and using the third Mobile Station International Subscriber Directory Number (MSISDN) as calling line identity (CLI), receiving the test call on the second Mobile Station International Subscriber Directory Number (MSISDN).

Thereby, it is advantageously possible according to the present invention that additional information regarding the roaming functionality can be obtained.

According to a further preferred embodiment of the present invention, a second Key Performance Indicator (KPI) is obtained after receiving the test call on the second Mobile Station International Subscriber Directory Number (MSISDN), wherein the second Key Performance Indicator (KPI) is related to the result of the calling line identity (CLI) inbound and/or to the voice Mobile Terminated inbound. It is to be understood that it is possible and even preferred according to the present invention that the successful execution of the calling line identity (CLI) inbound functionality and the successful execution of the voice Mobile Terminated inbound functionality relate to two different Key Performance Indicators (KPI).

Thereby, it is advantageously possible according to the present invention that a valuable Key Performance Indicator (KPI) information is accessible in a simple and efficient manner.

According to another preferred embodiment of the present invention, the method comprises, after triggering the outgoing test call to the Mobile Station Roaming Number (MSRN), the following further step:

receiving an IDP message based on a predefined OCSI (Originating CAMEL Subscriber Information) trigger.

Thereby, it is advantageously possible to obtain an information regarding the outbound calling line identity (CLI) functionality in case that the second public land mobile network (PLMN) (and also the first public land mobile network (PLMN)) has a CAMEL functionality.

It is furthermore preferred that a third Key Performance Indicator (KPI) is obtained after receiving the IDP message, wherein the third Key Performance Indicator (KPI) is related to the result of the calling line identity (CLI) outbound and/or to the voice Mobile Terminated outbound. It is to be understood that it is possible and even preferred according to the present invention that the successful execution of the calling line identity (CLI) outbound functionality and the successful execution of the voice Mobile Terminated outbound functionality relate to two different Key Performance Indicators (KPI).

Thereby, the information regarding the correct working of the calling line identity (CLI) outbound and/or to the voice Mobile Terminated outbound functionality can be obtained very cost effectively.

Furthermore, the present invention relates to a system for testing an inbound and/or an outbound roaming functionality of a first public land mobile network (PLMN) and a second public land mobile network (PLMN), wherein the system comprises a test pool of Subscriber Identity Modules (SIM), wherein the system comprises a test system located in a third public land mobile network, wherein the system is configured for:

initializing a first Mobile Station International Subscriber Directory Number (MSISDN) as a testing number in the first public land mobile network (PLMN), initializing a second Mobile Station International Subscriber Directory Number (MSISDN) as a testing number in the first public land mobile network (PLMN), activating the functionality Call Forwarding on Not Reachable (CFNRc) on the first Mobile Station International Subscriber Directory Number (MSISDN) with forwarding to the second Mobile Station International Subscriber Directory Number (MSISDN), forwarding of a Provide Roaming Number (PRN) request for the first Mobile Station International Subscriber Directory Number (MSISDN) to a Visitor Location Register (VLR) of the second public land mobile network (PLMN), receiving a Mobile Station Roaming Number (MSRN) from the Visitor Location Register (VLR) of the second public land mobile network (PLMN).

Additionally, the present invention relates to a program comprising a computer readable program code means that when executed in a controlling system performs the method according to the present invention.

Still additionally, the present invention relates to computer program product comprising a computer readable program code means that when executed in a controlling system performs the method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
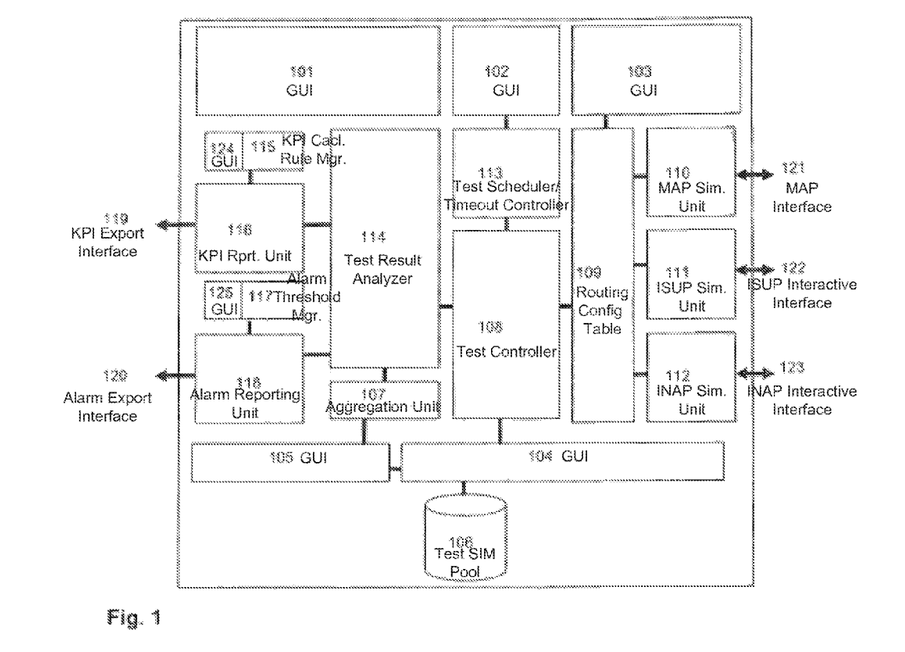
FIG. 1 schematically illustrates an inventive system for testing an inbound and/or an outbound roaming functionality of a first public land mobile network (PLMN) and a second public land mobile network (PLMN).

In FIG. 1, the high level architecture of an example of an inventive system for testing an inbound and/or an outbound roaming functionality of a first public land mobile network (PLMN) and a second public land mobile network (PLMN) is schematically shown. Reference sign 101 shows a graphical user interface (GUI) for analysis and reporting purposes. Reference sign 102 shows a graphical user interface (GUI) for test campaign configuration. Reference sign 103 shows a graphical user interface (GUI) for defining the routing configuration. Reference sign 104 shows a graphical user interface (GUI) for configuring the test card or test cards. Reference sign 105 shows a graphical user interface (GUI) relating to aggregation rules. Reference sign 106 shows a test Subscriber Identity Module (SIM) pool. Reference sign 107 shows an aggregation unit. Reference sign 108 shows a central test controller. Reference sign 109 shows a routing configuration table. Reference sign 110 shows a Mobile Application Part (MAP) simulation unit. Reference sign 111 shows an ISDN user part (ISUP) simulation unit. Reference sign 112 shows an Intelligent Network Application Part (INAP) simulation unit. Reference sign 113 shows Test Scheduler/Timeout controller. Reference sign 114 shows a test result analyser. Reference sign 115 shows a Key Performance Indicator (KPI) calculation rule manager. Reference sign 116 shows a Key Performance Indicator (KPI) reporting unit. Reference sign 117 shows an alarm threshold manager. Reference sign 118 shows an alarm reporting unit. Reference sign 119 shows a Key Performance Indicator (KPI) export interface. Reference sign 120 shows an alarm export interface. Reference sign 121 shows a Mobile Application Part (MAP) interactive interface. Reference sign 122 shows an ISDN user part (ISUP) interactive interface. Reference sign 123 shows an Intelligent Network Application Part (INAP) interactive interface. Reference sign 124 shows a graphical user interface for Key Performance Indicator (KPI) calculation rules. Reference sign 125 shows a graphical user interface for alarm thresholds.

Figure 2:
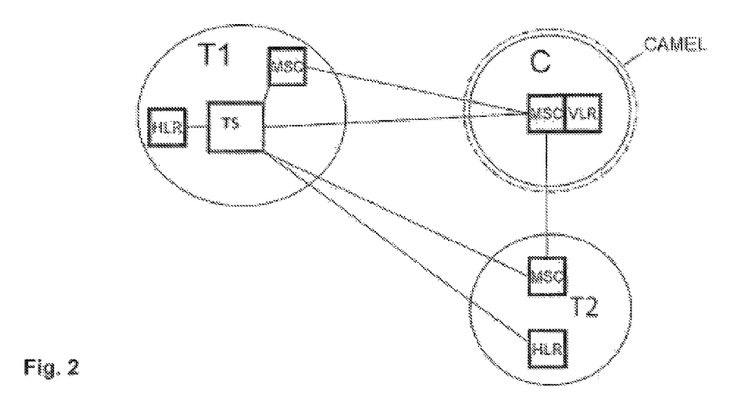
FIG. 2 schematically illustrates the network architecture for testing the inbound and/or the outbound roaming functionality.

In FIG. 2, the network architecture for testing the inbound and/or the outbound roaming functionality is schematically shown. In FIG. 2, an embodiment of the present invention is shown where the test System TS is located in a another public land mobile network (PLMN) T1 than the public land mobile network (PLMN) T2 to be tested. This is represented by means of a public land mobile network (PLMN) designated by reference sign T1 and a public land mobile network (PLMN) designated by reference sign T2. The public land mobile network (PLMN) T2 is the network to be tested, i.e. the first public land mobile network (PLMN) according to the present invention. The public land mobile network (PLMN) T1 is the network where the test System TS is located, i.e. a "third" public land mobile network (PLMN) according to the present invention, i.e. the test System TS is located in a public land mobile network (PLMN) distinct from the first public land mobile network (PLMN) T2. This corresponds to the hosting solution of the testing system TS. The first public land mobile network (PLMN) T2, i.e. the public land mobile network (PLMN) to be tested, comprises an Mobile Switching Center (MSC), and a Home Location Register (HLR). The first public land mobile network (PLMN) T2 also comprises a Mobile Switching Center (MSC). A second (or foreign) public land mobile network (PLMN) is referred to by means of reference sign C. The second public land mobile network (PLMN) C comprise a Visitor Location Register (VLR) as well as an Mobile Switching Center (MSC). According to the hosting solution of the test system TS (as shown in FIG. 2), the test system can be located in the third public land mobile network (PLMN) T1.

According to an alternative embodiment of the present invention (not represented in the Figures) the test System TS can also be located in the first public land mobile network (PLMN) T2.

Figure 3:
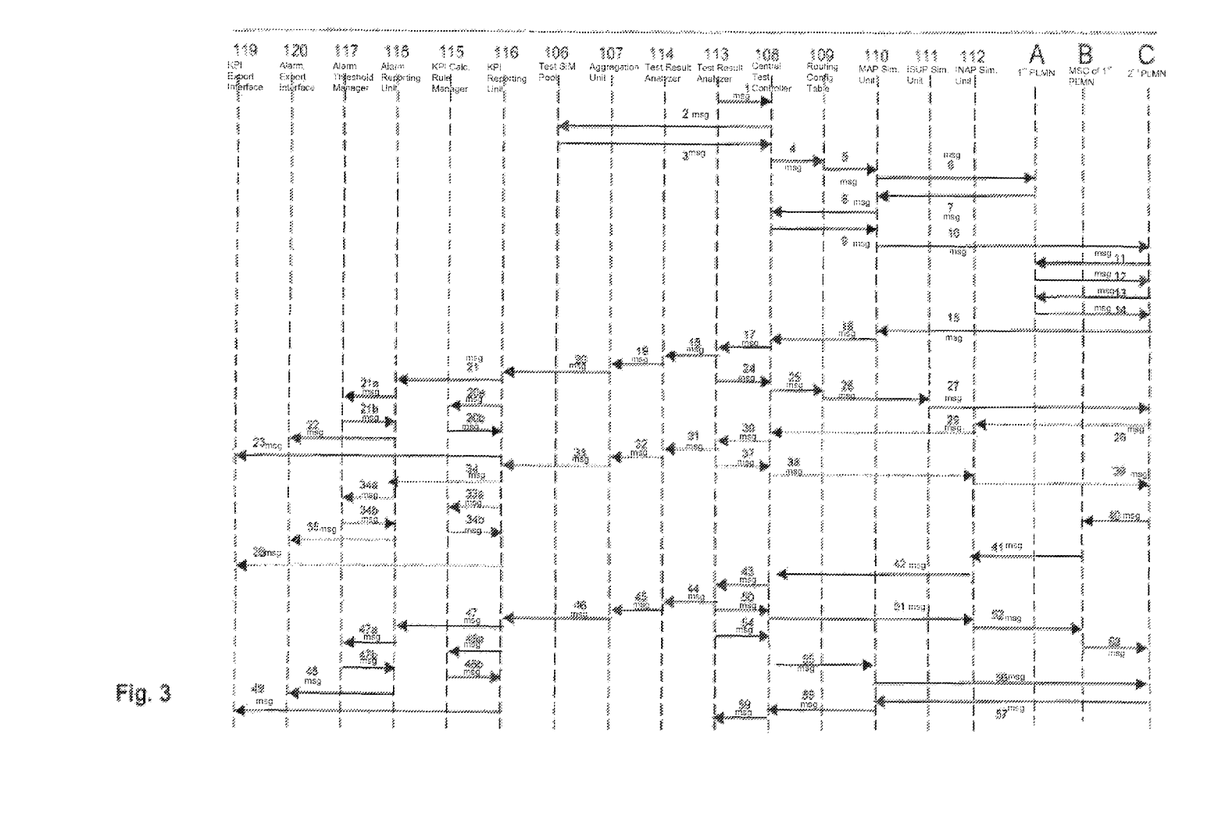
FIG. 3 schematically illustrates a functional diagram for testing the inbound and/or the outbound roaming functionality.

In FIG. 3, a functional diagram for testing the inbound and/or the outbound roaming functionality is schematically shown. The functional diagram of FIG. 3 takes into consideration all the units and components of the system for testing described with FIG. 1.

In a first step of the inventive method, a message 1 is sent from the test scheduler/timeout controller 113 to the central test controller 108. This corresponds to the start of the test campaign by the scheduler 113.

In a second step of the inventive method, a message 2 is sent from the central test controller 108 to the test Subscriber Identity Module (SIM) pool 106. This corresponds to an assignment of three test Subscriber Identity Modules (SIM) by the central test controller. Thereby, three Mobile Station International Subscriber Directory Number (MSISDN) are initialized, namely a first Mobile Station International Subscriber Directory Number (MSISDN), a second Mobile Station International Subscriber Directory Number (MSISDN), and a third Mobile Station International Subscriber Directory Number (MSISDN).

In a third step of the inventive method, a message 3 is sent from the test Subscriber Identity Module (SIM) pool 106 to the central test controller 108. This corresponds to the allocation of routing information by a routing table.

In a fourth step of the inventive method, a message 4 is sent from the central test controller 108 to the routing configuration table 109. This corresponds to the start of Mobile Application Part (MAP) simulation "activate supplementary service" by the central test unit or testing system.

In a fifth step of the inventive method, a message 5 is sent from the routing configuration table 109 to the Mobile Application Part (MAP) simulation unit 110. This corresponds to the allocation of routing information by the routing table with a trigger to the Mobile Application Part (MAP) simulation unit 110.

In a sixth step of the inventive method, a message 6 is sent from Mobile Application Part (MAP) simulation unit 110 to the Home Location Register (HLR) of the first public land mobile network (PLMN) A. This corresponds to the activation of the Call Forwarding on Not Reachable (CFNRc) functionality on the first Mobile Station International Subscriber Directory Number (MSISDN) with forwarding to the second Mobile Station International Subscriber Directory Number (MSISDN).

In a seventh step of the inventive method, a message 7 is sent from the Home Location Register (HLR) of the first public land mobile network (PLMN) A to the Mobile Application Part (MAP) simulation unit 110. This corresponds to the confirmation of successful activation of the Call Forwarding on Not Reachable (CFNRc) functionality.

In a eighth step of the inventive method, a message 8 is sent from the Mobile Application Part (MAP) simulation unit 110 to the central test controller 108. This corresponds to the confirmation of successful activation of the Call Forwarding on Not Reachable (CFNRc) functionality.

In a ninth step of the inventive method, a message 9 is sent from the central test controller 108 to the Mobile Application Part (MAP) simulation unit 110. This corresponds to the start of the procedure Provide Roaming Number (PRN) by the central test controller 108.

In a tenth step of the inventive method, a message 10 is sent from the Mobile Application Part (MAP) simulation unit 110 to the Mobile Switching Center (MSC)/Visitor Location Register (VLR) of the second public land mobile network (PLMN) C. This corresponds to forwarding the Provide Roaming Number (PRN) request for the first Mobile Station International Subscriber Directory Number (MSISDN).

In an eleventh step of the inventive method, a message 11 is sent from the second public land mobile network (PLMN) C to the first public land mobile network (PLMN) A. This corresponds to the start of a Restore Data procedure (for the first Mobile Station International Subscriber Directory Number (MSISDN)) to the Home Location Register (HLR) of the first public land mobile network (PLMN) A. This step is necessary because in reality, a Mobile Station corresponding to the first Mobile Station International Subscriber Directory Number (MSISDN) cannot be found within the second public land mobile network (PLMN) C and therefore, the Visitor Location Register (VLR) of the second public land mobile network (PLMN) C needs to perform a Restore Data procedure.

In a twelfth step of the inventive method, a message 12 is sent from the first public land mobile network (PLMN) A to the second public land mobile network (PLMN) C. This corresponds to forwarding of the Insert Subscriber Data (including the settings regarding the Call Forwarding on Not Reachable (CFNRc) and including CSI (CAMEL Subscriber Information)) for the first Mobile Station International Subscriber Directory Number (MSISDN) to the Visitor Location Register (VLR) of the second public land mobile network (PLMN) C.

In a thirteenth step of the inventive method, a message 13 is sent from the second public land mobile network (PLMN) C to the first public land mobile network (PLMN) A. This corresponds to the confirmation of the successful receipt of subscriber data regarding the first Mobile Station International Subscriber Directory Number (MSISDN) at the Visitor Location Register (VLR) of the second public land mobile network (PLMN) C.

In a fourteenth step of the inventive method, a message 14 is sent from the first public land mobile network (PLMN) A to the second public land mobile network (PLMN) C. This corresponds to the completion of the restore data procedure by the Home Location Register (HLR) of the first public land mobile network (PLMN) A.

In a fifteenth step of the inventive method, a message 15 is sent from the second public land mobile network (PLMN) C to the Mobile Application Part (MAP) simulation unit 110. This corresponds to the "foreign" Visitor Location Register (VLR) (i.e. the Visitor Location Register (VLR) of the second public land mobile network (PLMN) C) forwarding the Mobile Station Roaming Number (MSRN) after having successfully executed the location update outbound procedure related to the first Mobile Station International Subscriber Directory Number (MSISDN) to the test system TS; if the restore data procedure of the previous steps fails, the Visitor Location Register (VLR) of the second public land mobile network (PLMN) C sends a "system failure" message. The fifteenth step corresponds to the end of the Provide Roaming Number (PRN) procedure initiated in the ninth step.

In a sixteenth step of the inventive method, a message 16 is sent from the Mobile Application Part (MAP) simulation unit 110 to the central test controller 108. This corresponds to the forwarding of the Mobile Station Roaming Number (MSRN) (or the system failure message of the fifteenth step) to the central test controller 108.

In a seventeenth step of the inventive method, a message 17 is sent from the central test controller 108 to the Test Scheduler/Timeout controller Test Scheduler/Timeout controller 113. This corresponds to the forwarding of the Mobile Station Roaming Number (MSRN) (or the system failure message of the fifteenth step) to the Test Scheduler/Timeout controller 113 and also means that the Test Scheduler/Timeout controller 113 is reset.

In an eighteenth step of the inventive method, a message 18 is sent from the Test Scheduler/Timeout controller 113 to the test result analyser 114. This corresponds to the forwarding of the Mobile Station Roaming Number (MSRN) (or the system failure message of the fifteenth step) to the test result analyser 114 and thereby a check of successful Location update outbound.

The completion of the eighteenth step corresponds to the final step of "receiving a Mobile Station Roaming Number (MSRN) form the Visitor Location Register (VLR) of the second public land mobile network (PLMN) C" according to an embodiment of the present invention. By analysing the positive result of this procedure (Provide Roaming Number (PRN)), the first Key Performance Indicator (KPI) is obtained and preferably stored in either the Key Performance Indicator (KPI) reporting unit 116 or transmitted to the Key Performance Indicator (KPI) export interface 119. To this end, in a nineteenth step of the inventive method, a message 19 is sent from the test result analyser 114 to the aggregation unit 107 and in a twentieth step, a message 20 is sent from the aggregation unit 107 to the Key Performance Indicator (KPI) reporting unit 116. Further messages 20a and 20b are exchanged between the Key Performance Indicator (KPI) reporting unit 116 and the Key Performance Indicator (KPI) calculation rule manager 115 in order to calculate the Key Performance Indicator (KPI) and to forward the Key Performance Indicator (KPI) value. Still in order to report the successful or unsuccessful reception of the Mobile Station Roaming Number (MSRN) by the first public land mobile network (PLMN), a message 21 is sent in a twenty-first step of the inventive method from the Key Performance Indicator (KPI) reporting unit 116 to the alarm reporting unit 118. This corresponds to the forwarding of the result (Mobile Station Roaming Number (MSRN) successful or not) to the alarm reporting unit 118. To the same end, further messages 21a and 21b are exchanged between the alarm reporting unit 118 and the alarm threshold manager 117 in order to verify the alarm threshold and—in case of a threshold breach—to forward the alarm to the alarm reporting unit 118, and—in a twenty-second step of the inventive method—a message 22 is sent from the alarm reporting unit 118 to the alarm export interface 120.

Finally, the Key Performance Indicator (KPI) is forwarded to the Key Performance Indicator (KPI) export interface 119 by means of a message 23 in a twenty-third step.

In case that the functionality test should be continued in order to obtain further Key Performance Indicator (KPI), the test procedure is continued.

In a twenty-fourth step of the inventive method, a message 24 is sent from the Test Scheduler/Timeout controller 113 to the central test controller 108. This corresponds to the beginning of the triggering of an outgoing test call to the Mobile Station Roaming Number (MSRN) and using the third Mobile Station International Subscriber Directory Number (MSISDN) as calling line identity (CLI).

In a twenty-fifth step of the inventive method, a message 25 is sent from the central test controller 108 to the routing configuration table 109. This corresponds to the start of the outgoing call procedure based on the Mobile Station Roaming Number (MSRN) received by the test system TS of the first public land mobile network (PLMN) A.

In a twenty-sixth step of the inventive method, a message 26 is sent from the routing configuration table 109 to the ISDN user part (ISUP) simulation unit 111. This corresponds to the routing of the outgoing call to the ISDN user part (ISUP) simulation unit 111 using the third Mobile Station International Subscriber Directory Number (MSISDN) as the calling line identity (CLI).

In a twenty-seventh step of the inventive method, a message 27 is sent from the ISDN user part (ISUP) simulation unit 111 to the Mobile Switching Center (MSC) of the second public land mobile network (PLMN) C. This corresponds to the forwarding of the outgoing test call.

In case that in the second public land mobile network (PLMN) C the CAMEL protocol (Customised Applications for Mobile networks Enhanced Logic) is enabled, a message 28 is sent in a twenty-eighth step from the second public land mobile network (PLMN) C to the Intelligent Network Application Part (INAP) simulation unit 112. This corresponds to the starting of an Intelligent Network (IN) dialog and the sending of an IDP message based on a predefined OCSI trigger (Original CAMEL Subscriber Information) to the test system TS including the calling line identity (CLI) of the third Mobile Station International Subscriber Directory Number (MSISDN).

In a twenty-ninth step of the inventive method, a message 29 is sent from the Intelligent Network Application Part (INAP) simulation unit 112 to the central test controller 108. This corresponds to the forwarding of the IDP message (including the calling line identity (CLI) of the third Mobile Station International Subscriber Directory Number (MSISDN)).

In a thirtieth step of the inventive method, a message 30 is sent from the central test controller 108 to the Test Scheduler/Timeout controller 113. This corresponds to the forwarding of the IDP message (including the calling line identity (CLI) of the third Mobile Station International Subscriber Directory Number (MSISDN)) and results in resetting of the Test Scheduler/Timeout controller 113.

In a thirty-first step of the inventive method, a message 31 is sent from the Test Scheduler/Timeout controller 113 to the test result analyser test result analyser 114, the message 31 comprising either the timeout (corresponding to a failure) or the calling line identity (CLI) of the third Mobile Station International Subscriber Directory Number (MSISDN). Thereby, it is possible to check whether the IDP message has been correctly receive (comprising the calling line identity (CLI) of the third Mobile Station International Subscriber Directory Number (MSISDN)). Furthermore, it is possible according to the present invention to compare the calling line identity (CLI) value of the IDP message with the third Mobile Station International Subscriber Directory Number (MSISDN) (=calling line identity (CLI) of the outgoing test call).

The completion of the thirty-first step corresponds to the final step of "receiving an IDP message based on a predefined OCSI trigger" according to an embodiment of the present invention. By analysing the positive result of this procedure (calling line identity (CLI) present in the IDP message corresponds to the third Mobile Station International Subscriber Directory Number (MSISDN)), the third Key Performance Indicator (KPI) is obtained and preferably stored in either the Key Performance Indicator (KPI) reporting unit 116 or transmitted to the Key Performance Indicator (KPI) export interface 119. The third Key Performance Indicator (KPI) is related to the result of the calling line identity (CLI) outbound procedure and/or to the result of the voice Mobile Terminated outbound procedure.

To the end of reporting and processing the Key Performance Indicator (KPI) value, a message 32 is sent in a thirty-second step from the test result analyser 114 to the aggregation unit 107. This corresponds to the forwarding of the result (receipt of IDP, calling line identity (CLI), voice Mobile Terminated successful or error) to the aggregation unit 107 and thereby to a result aggregation. In a thirty-third step of the inventive method, a message 33 is sent from the aggregation unit 107 to the Key Performance Indicator (KPI) reporting unit 116. Further messages 33a and 33b are exchanged between the Key Performance Indicator (KPI) reporting unit 116 and the Key Performance Indicator (KPI) calculation rule manager 115 in order to calculate the third Key Performance Indicator (KPI) and to forward the Key Performance Indicator (KPI) value. Still in order to report the successful or unsuccessful reception of the IDP/calling line identity (CLI) outbound/voice Mobile Terminated outbound result by the first public land mobile network (PLMN), a message 34 is sent in a thirty-fourth step of the inventive method from the Key Performance Indicator (KPI) reporting unit 116 to the alarm reporting unit 118. This corresponds to the forwarding of the result (IDP message received, calling line identity (CLI) correct and/or voice Mobile Terminated successful) to the alarm reporting unit 118. To the same end, further messages 34a and 34b are exchanged between the alarm reporting unit 118 and the alarm threshold manager 117 in order to verify the alarm threshold and—in case of a threshold breach—to forward the alarm to the alarm reporting unit 118, and—in a thirty-fifth step of the inventive method—a message 35 is sent from the alarm reporting unit 118 to the alarm export interface 120.

Finally, the third Key Performance Indicator (KPI) is forwarded to the Key Performance Indicator (KPI) export interface 119 by means of a message 36 in a thirty-sixth step.

In a thirty-seventh step of the inventive method, a message 37 is sent from the Test Scheduler/Timeout controller 113 to the central test controller 108. This corresponds to triggering (by the test system TS) of a IDP continue message to be sent to the second public land mobile network (PLMN) C.

In a thirty-eighth step of the inventive method, a message 38 is sent from the central test controller 108 to the Intelligent Network Application Part (INAP) simulation unit 112 and in a thirty-ninth step, a message 39 is sent from the Intelligent Network Application Part (INAP) simulation unit 112 to the Mobile Switching Center (MSC) of the second public land mobile network (PLMN) C. This corresponds to forwarding of the IDP continue message to the second public land mobile network (PLMN) C.

In a fortieth step of the inventive method, a message 40 is sent from the Mobile Switching Center (MSC) of the second public land mobile network (PLMN) C to the Mobile Switching Center (MSC) B of the first public land mobile network (PLMN) A. This corresponds to the call-forwarding of the test call (initiated in the twenty-fourth step) to the second Mobile Station International Subscriber Directory Number (MSISDN) (due to the activated Call Forwarding on Not Reachable (CFNRc) functionality (after a global paging in the second public land mobile network (PLMN)) and the fact that no mobile station is present in the network of the second public land mobile network (PLMN) C corresponding to the first Mobile Station International Subscriber Directory Number (MSISDN)).

In a forty-first step of the inventive method, a message 41 is sent from the Mobile Switching Center (MSC) B to the Intelligent Network Application Part (INAP) simulation unit 112. This corresponds to forwarding (with the IDP) of the incoming call to the test system TS based on dialled Intelligent Network (IN) trigger in the Gateway Mobile Switching Center (GMSC) B of the first public land mobile network (PLMN) A. The dialled Intelligent Network (IN) trigger is based on the range of the second Mobile Station International Subscriber Directory Number (MSISDN) of the first public land mobile network (PLMN).

In a forty-second step of the inventive method, a message 42 is sent from the Intelligent Network Application Part (INAP) simulation unit 112 to the central test controller 108. This corresponds to forwarding of the result of the procedure (calling line identity (CLI) inbound/voice Mobile Terminated inbound or failure (timeout)) to the central test controller 108.

In a forty-third step of the inventive method, a message 43 is sent from the central test controller 108 to the Test Scheduler/Timeout controller 113. This corresponds to the forwarding of the result of the procedure and results in resetting of the Test Scheduler/Timeout controller 113.

In a forty-fourth step of the inventive method, a message 44 is sent from the Test Scheduler/Timeout controller 113 to the test result analyser 114, the message comprising either the timeout (corresponding to a failure) or an information on the successful execution of the calling line identity (CLI) inbound and/or voice Mobile Terminated inbound procedures.

Thereby, it is possible to check whether the calling line identity (CLI) inbound and/or the voice Mobile Terminated inbound procedures have been correctly executed. Furthermore, it is possible according to the present invention to compare the received calling line identity (CLI) value with the third Mobile Station International Subscriber Directory Number (MSISDN) (=calling line identity (CLI) of the outgoing test call).

The completion of the forty-fourth step corresponds to the final step of "triggering an outgoing test call to the Mobile Station Roaming Number (MSRN) and using the third Mobile Station International Subscriber Directory Number (MSISDN) as calling line identity (CLI), and receiving the test call on the second Mobile Station International Subscriber Directory Number (MSISDN)" according to an embodiment the present invention. By analysing the positive result of this procedure, the second Key Performance Indicator (KPI) is obtained and preferably stored in either the Key Performance Indicator (KPI) reporting unit 116 or transmitted to the Key Performance Indicator (KPI) export interface 119. The second Key Performance Indicator (KPI) is related to the result of the calling line identity (CLI) inbound procedure and/or to the result of the voice Mobile Terminated inbound procedure.

To the end of reporting and processing the second Key Performance Indicator (KPI) value, a message 45 is sent in a forty-fifth step from the test result analyser 114 to the aggregation unit 107. This corresponds to the forwarding of the result (calling line identity (CLI) inbound procedure and/or voice Mobile Terminated inbound procedure successful or error) to the aggregation unit 107 and thereby to a result aggregation. In a forty-sixth step of the inventive method, a message 46 is sent from the aggregation unit 107 to the Key Performance Indicator (KPI) reporting unit 116. Further messages 46a and 46b are exchanged between the Key Performance Indicator (KPI) reporting unit 116 and the Key Performance Indicator (KPI) calculation rule manager 115 in order to calculate the second Key Performance Indicator (KPI) and to forward the Key Performance Indicator (KPI) value. Still in order to report the successful or unsuccessful termination of the procedures calling line identity (CLI) inbound and/or voice Mobile Terminated inbound, a message 47 is sent in a forty-seventh step of the inventive method from the Key Performance Indicator (KPI) reporting unit 116 to the alarm reporting unit 118. This corresponds to the forwarding of the result (calling line identity (CLI) inbound correct and/or voice Mobile Terminated inbound successful) to the alarm reporting unit 118. To the same end, further messages 47a and 47b are exchanged between the alarm reporting unit 118 and the alarm threshold manager 117 in order to verify the alarm threshold and—in case of a threshold breach—to forward the alarm to the alarm reporting unit 118, and—in a forty-eighth step of the inventive method—a message 48 is sent from the alarm reporting unit 118 to the alarm export interface 120.

Finally, the third Key Performance Indicator (KPI) is forwarded to the Key Performance Indicator (KPI) export interface 119 by means of a message 49 in a forty-ninth step.

According to the present invention, it is thereby advantageously possible to detect the use of a misuse scenario called SIM box fraud, i.e. the use of end user SIM cards (typically having flat fee contracts) for carrier services. For example, in case that the used calling line identity (CLI) for the outbound test call is different from the received calling line identity (CLI), this fact is an indication for a SIM box fraud scenario, and hence such a fraud can be more easily detected.

In a fiftieth step of the inventive method, a message 50 is sent from the Test Scheduler/Timeout controller 113 to the central test controller 108. This corresponds to triggering a call release by the Test Scheduler/Timeout controller 113 in order to effect that the test call is free of charge.

In a fifty-first, a fifty-second and a fifty-third step of the inventive method, messages 51, 52 and 53 are sent from the central test controller 108 to the Intelligent Network Application Part (INAP) 112, from the Intelligent Network Application Part (INAP) simulation unit 112 to the Gateway Mobile Switching Center (GMSC) of the first public land mobile network (PLMN), and from the Gateway Mobile Switching Center (GMSC) to the (Visitor Location Register (VLR) of the) second public land mobile network (PLMN) C. These messages 51, 52, 53 aim at forwarding the call release.

In a fifty-fourth step of the inventive method, a message 54 is sent from the Test Scheduler/Timeout controller 113 to the central test controller 108. This corresponds to triggering a cancel location procedure by the Test Scheduler/Timeout controller 113. This causes in a fifty-fifth step of the inventive method, a message 55 sent from the central test controller 108 to the Mobile Application Part (MAP) simulation unit 110. This corresponds to forwarding a cancel location message to the Mobile Application Part (MAP) simulation unit 110.

In a fifty-sixth step of the inventive method and by means of a message 56 the cancel location message is sent from the Mobile Application Part (MAP) simulation unit 110 to the second public land mobile network (PLMN) C.

In a fifty-seventh step of the inventive method and by means of a message 57 sent from the second public land mobile network (PLMN) C to the Mobile Application Part (MAP) simulation unit 110, the cancel location is confirmed by the (foreign) second public land mobile network (PLMN).

In a fifty-eighth and a fifty-ninth step of the inventive method, messages 58 and 59 are sent from the Mobile Application Part (MAP) simulation unit 110 to the central test controller 108 and from the central test controller 108 to the Test Scheduler/Timeout controller 113 in order to forward the result (successful cancel location) to the central test controller 108 and to the Test Scheduler/Timeout controller 113. This means that the cancel location procedure is successfully terminated and the Test Scheduler/Timeout controller 113 can be reset.

According to the present invention, the determination of the first Key Performance Indicator (KPI) (location update outbound) corresponds to the first step to the twenty-third step and to the fifty-fourth to the fifty-ninth step.

According to the present invention, the determination of the second Key Performance Indicator (KPI) (voice Mobile Terminated inbound and/or calling line identity (CLI) inbound) corresponds to the twenty-fourth step to the twenty-seventh step and to the fortieth step to the fifty-ninth step.

According to the present invention, the determination of the third Key Performance Indicator (KPI) (voice Mobile Terminated outbound and/or calling line identity (CLI) outbound) corresponds to the twenty-eighth step to the thirty-sixth step. The determination of the third Key Performance Indicator (KPI) requires a CAMEL (roaming) functionality in the second public land mobile network (PLMN) C.

The invention claimed is:

1. A method for testing at least one of an inbound or an outbound roaming functionality of a first public land mobile network (PLMN) and a second PLMN, wherein a test system is located in a third public land mobile network, the method comprising:
   sending, from a central test controller a message to a test Subscriber Identity Module (SIM) pool, corresponding to assigning three SIMs by the central test controller so as to initialize a first Mobile Station international Subscriber Directory Number (MSISDN), a second MSISDN, and a third MSISDN;
   assigning the first MSISDN as a testing number in the first PLMN;
   triggering a simulated initiation of the first MSISDN in the second PLMN;
   assigning the second MSISDN as a testing number in the first PLMN;
   sending from a Mobile Application Part (MAP) simulation unit a message via a MAP interactive interface to a Home Location Register (HLR) of the first PLMN, corresponding to activating Call Forwarding on Not Reachable (CFNRc) functionality on the first MSISDN with forwarding to the second MSISDN;
   sending a message from the central test controller to the MAP simulation unit, corresponding to the central test controller starting a Provide Roaming Number (PRN) procedure;
   sending from the MAP simulation unit a message via the MAP interactive interface to a Mobile Switching Center (MSC) and/or a Visitor Location Register (VLR) of the second PLMN, corresponding to forwarding a PRN request for the first MSISDN; and
   receiving by a test result analyzer a Mobile Station Roaming Number (MSRN) from the VLR of the second PLMN;
   initializing the third MSISDN as a testing number in the first PLMN;
   sending from a Test Scheduler/Timeout controller a message to the central test controller, corresponding to beginning of triggering of an outgoing test call to the MSRN and using the third MSISDN as a calling line identity (CLI);
   sending by an International Subscriber Directory Number (ISDN) user part (ISUP) simulation unit via an ISUP interactive interface a message to a MSC of the second PLMN, corresponding to a forwarding of an outgoing test call;
   receiving by an Intelligent Network Application Part (NAP) simulation unit via the INAP interactive interface a message from the second PLMN in case that in the second PLMN a Customized Applications for Mobile networks Enhanced Logic (CAMEL) protocol is enabled, corresponding to a starting of an Intelligent Network (IN) dialog and a sending of an Initial Detection Point (IDP) message based on a predefined Original CAMEL Subscriber Information (OCSI) trigger to the system including a CLI of the third MSISDN;
   sending a message from the Test Scheduler/Timeout controller to the test result analyzer, corresponding to receiving the test call on the second MSISDN;
   wherein the MAP interactive interface is operatively coupled with the central test controller via the MAP simulation unit;
   wherein the ISUP interactive interface is operatively coupled with the central test controller via the ISUP simulation unit; and
   wherein the INAP interactive interface is operatively coupled with the central test controller via the INAP simulation unit.

2. The method according to claim 1, wherein the MAP simulation unit receives a message sent from the HLR of the first PLMN via the MAP interactive interface, corresponding to a confirmation of a successful activation of the CFNRc functionality.

3. The method according to claim 2, wherein the MAP simulation unit receives a message from the second PLMN via the MAP interactive interface, corresponding to the VLR of the second PLMN forwarding the MSRN after having successfully executed a location update outbound procedure related to the first MSISDN to the system.

4. The method according to claim 3, wherein the INAP simulation unit sends via the INAP interactive interface a message to the MSC of the second PLMN, corresponding to forwarding an IDP continue message to the second PLMN.

5. The method according to claim 4, wherein the INAP simulation unit receives via the INAP interactive interface a message sent from the MSC, corresponding to forwarding with the IDP of the incoming call to the test system (TS) based on dialled IN trigger in a Gateway Mobile Switching Center (GMSC) of the first PLMN.

6. The method according to claim 5, wherein the INAP simulation unit sends via the INAP interactive interface a message, received from the central test controller, to the GMSC of the first PLMN, corresponding to forwarding the call release.

7. The method according to claim 6, wherein the MAP simulation unit sends via the MAP interactive interface a cancel location message to the second PLMN.

8. The method according to claim 7, wherein the MAP simulation unit receives via the MAP interactive interface a message sent from the second PLMN, the message corresponding to a confirmation of the cancel location by the second PLMN.

9. The method according to claim 8, wherein a first Key Performance Indicator (KPI) is obtained after receiving the MSRN from the VLR of the second PLMN, wherein the first KPI is related to the location update outbound; and
   wherein a second KPI is obtained after receiving the test call on the second MSISDN, wherein the second KPI is related to the result of the CLI inbound and/or to the voice Mobile Terminated inbound; and wherein a third KPI is obtained after receiving the IDP message, wherein the third KPI is related to the result of the CLI outbound and/or to a voice Mobile Terminated outbound.

10. A system for testing an inbound and/or an outbound roaming functionality of a first public land mobile network (PLMN) and a second PLMN, wherein the system comprises a test pool of Subscriber Identity Modules (SIMs), wherein the system comprises:

a central test controller configured to send a message to the test pool of SIMS, whereby three test SIMs are assigned and whereby a first Mobile Station International Subscriber Directory Number (MSISDN) and a second MSISDN and a third MSISDN are initialized; wherein the central test controller is further configured to send a message to a Mobile Application Part (MAP) simulation unit, corresponding to a start of a Provide Roaming Number (PRN) procedure by the central test controller;

wherein the system is configured to assign the first MSISDN as a testing number in the first PLMN;

wherein the system is configured to trigger a simulated initiation of the first MSISDN in the second PLMN;

wherein the system is configured to assign a second MSISDN as a testing number in the first PLMN;

the MAP simulation unit, configured to send via a MAP interactive interface a message to a Home Location Register (HLR) of the first PLMN, corresponding to an activation of a Call Forwarding on Not Reachable (CFNRc) functionality on the first MSISDN with forwarding to the second MSISDN;wherein the MAP simulation unit is further configured to send a message via the MAP interactive interface to a Mobile Switching Center (MSC) and/or a Visitor Location Register (VLR) of the second PLMN, corresponding to a forwarding of a PRN request for the first MSISDN; and wherein the system is configured to activate the CFNRc functionality on the first MSISDN with forwarding to the second MSISDN;

wherein the system is configured to forward the PRN request for the first MSISDN to a VLR of the second PLMN;

a test result analyzer, configured to receive a Mobile Station Roaming Number (MSRN) from the VLR of the second PLMN;

wherein the system is configured to initialize the third MSISDN as a testing number in the first PLMN;

a Test Scheduler/Timeout controller, configured to send a message to the central test controller, corresponding to a beginning of triggering an outgoing test call to the MSRN and using the third MSISDN as a calling line identity (CLI), and wherein the Test Scheduler/Timeout controller is further configured to send a message to the test result analyzer, corresponding to receiving a test call on the second MSISDN;

an International Subscriber Directory Number (ISDN) user part (ISUP) simulation unit, configured to send via an ISUP interactive interface a message to the MSC of the second PLMN, corresponding to a forwarding of an outgoing test call; and an Intelligent Network Application Part (INAP) simulation unit, configured to receive via the INAP interactive interface a message from the second PLMN, in case that in the second PLMN a Customized Applications for Mobile networks Enhanced Logic (CAMEL) protocol is enabled, corresponding to a starting of an Intelligent Network (IN) dialog and a sending of an Initial Detection Point (IDP) message based on a predefined Original CAMEL Subscriber Information (OCSI) trigger to the system including a CLI of the third MSISDN;

wherein the MAP interactive interface is operatively coupled with the central test controller via the MAP simulation unit; and wherein the ISUP interactive interface is operatively coupled with the central test controller via the ISUP simulation unit; and wherein the INAP interactive interface is operatively coupled with the central test controller via the INAP simulation unit.

11. The system according to claim 10, wherein the MAP simulation unit is configured to receive a message sent from the HLR of the first PLMN via the MAP interactive interface, corresponding to a confirmation of a successful activation of the CFNRc functionality; and wherein the MAP simulation unit is further configured to receive a message from the second PLMN via the MAP interactive interface, corresponding to the VLR of the second PLMN forwarding the MSRN after having successfully executed a location update outbound procedure related to the first MSISDN to the system.

12. The system according to claim 11, wherein the INAP simulation unit is configured to send via the INAP interactive interface a message to the MSC of the second PLMN, corresponding to forwarding of an IDP continue message to the second PLMN; and wherein the INAP simulation unit is configured to receive via the INAP interactive interface a message sent from the MSC, corresponding to forwarding with the IDP of the incoming call to the test system (TS) based on dialled IN trigger in a Gateway Mobile Switching Center (GMSC) of the first PLMN; and wherein the INAP simulation unit is configured to send via the INAP interactive interface a message, received from the central test controller, to the GMSC of the first PLMN, corresponding to forwarding the call release.

13. The system according to claim 12, wherein the MAP simulation unit is further configured to send via the MAP interactive interface a cancel location message to the second PLMN; and wherein the MAP simulation unit is further configured to receive via the MAP interactive interface a message sent from the second PLMN, the message corresponding to a confirmation of the cancel location by the second PLMN.

14. A non-transitory, processor-readable medium having processor-executable instructions stored thereon for testing at least one of an inbound or an outbound roaming functionality of a first public land mobile network (PLMN) and a second PLMN, wherein a test system is located in a third public land mobile network, the processor-executable instructions, when executed by a processor, facilitating the performance of the following:

sending, from a central test controller a message to a test Subscriber Identity Module (SIM) pool, corresponding to assigning three SIMs by the central test controller so as to initialize a first Mobile Station International Subscriber Directory Number (MSISDN), a second MSISDN, and a third MSISDN;

assigning the first MSISDN as a testing number in the first PLMN;

triggering a simulated initiation of the first MSISDN in the second PLMN;

assigning the second MSISDN as a testing number in the first PLMN;

sending from a Mobile Application Part (MAP) simulation unit a message via a MAP interactive interface to a Home Location Register (HLR) of the first PLMN, corresponding to activating Call Forwarding on Not Reachable (CFNRc) functionality on the first MSISDN with forwarding to the second MSISDN;

sending a message from the central test controller to the MAP simulation unit, corresponding to the central test controller starting a Provide Roaming Number (PRN) procedure;

sending from the MAP simulation unit a message via the MAP interactive interface to a Mobile Switching Center (MSC) and/or a Visitor Location Register (VLR) of the second PLMN, corresponding to forwarding a PRN request for the first MSISDN; and receiving by a test result analyzer a Mobile Station Roaming Number (MSRN) from the VLR of the second PLMN;

initializing the third MSISDN as a testing number in the first PLMN; sending from a Test Scheduler/Timeout controller a message to the central test controller, corresponding to beginning of triggering of an outgoing test call to the MSRN and using the third MSISDN as a calling line identity (CLI);

sending by an International Subscriber Directory Number (ISDN) user part (ISUP) simulation unit via an ISUP interactive interface a message to a MSC of the second PLMN, corresponding to a forwarding of an outgoing test call;

receiving by an Intelligent Network Application Part (INAP) simulation unit via the INAP interactive interface a message from the second PLMN in case that in the second PLMN a Customized Applications for Mobile networks Enhanced Logic (CAMEL) protocol is enabled, corresponding to a starting of an Intelligent Network (IN) dialog and a sending of an Initial Detection Point (IDP) message based on a predefined Original CAMEL Subscriber Information (OCSI) trigger to the system including a CLI of the third MSISDN;

sending a message from the Test Scheduler/Timeout controller to the test result analyzer, corresponding to receiving the test call on the second MSISDN;

wherein the MAP interactive interface is operatively coupled with the central test controller via the MAP simulation unit;

wherein the ISUP interactive interface is operatively coupled with the central test controller via the ISUP simulation unit; and wherein the INAP interactive interface is operatively coupled with the central test controller via the INAP simulation unit.

* * * * *